B. J. LA MOTHE.
CAR AXLE.

No. 44,434. Patented Sept. 27, 1864.

Witnesses
Thos. Geo. Harved
Chas. H. Smith

Inventor
B. J. La Mothe

UNITED STATES PATENT OFFICE.

BERNARD J. LA MOTHE, OF NEW YORK, N. Y.

IMPROVEMENT IN CAR-AXLES.

Specification forming part of Letters Patent No. 44,434, dated September 27, 1864.

*To all whom it may concern:*

Be it known that I, BERNARD J. LA MOTHE, of the city and State of New York, have invented, made, and applied to use a certain new and useful Improvement in Axles or Shafts for Railroad-Cars, &c.; and I do hereby declare the following to be a full, clear, and exact description of the said invention, reference being had to the annexed drawings, making part of this specification, wherein—

Figure 1:
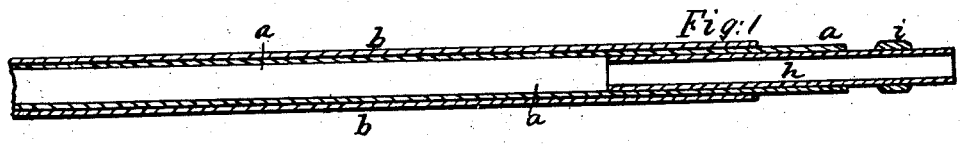
Figure 2:
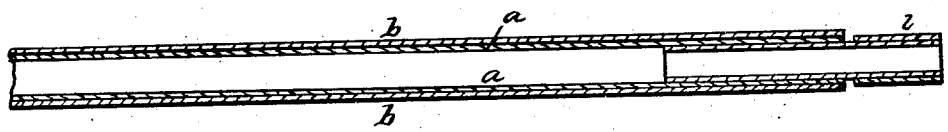
Figure 3:
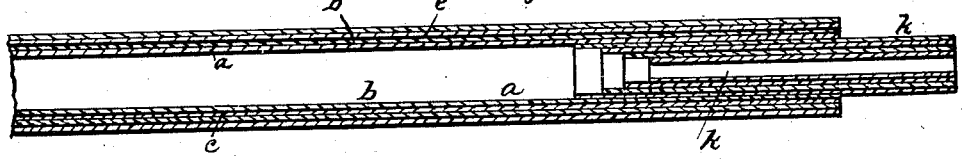

Figures 1, 2, and 3 are sections of axles or shafts representing my said improvements.

Similar letters denote the same parts.

Railroad-car axles and shaftings generally are liable to breakage, because they are of only one piece of metal, and a flaw or imperfect welding may not be noticed until broken apart by a strain.

The object of my invention is to obtain much greater strength and to remove liability of fracture without any increase in the weight of the shaft or axle; and said invention consists in a series of tubes shrunk one over the other, so as to form a car-axle or shaft that will not easily bend or break, and is much stronger than the solid axle, and is not any heavier, and under most circumstances can be made considerably lighter than the ordinary axles.

In the drawings, $a$ is the interior tube, of any desired size. $b$ is a tube, the bore of which is slightly smaller than the external diameter of the pipe $a$, so that when heated the said pipe $b$ can be slipped over the pipe $a$ and will, as it cools, contract firmly upon the pipe $a$ and form nearly the same as if the pipes had been made together. I then shrink on a third pipe, $c$, the same as before, and any desired number of such pipes may be employed.

Figure 4:
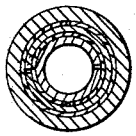

In Figs. 1 and 2 I have shown two of said pipes, and four in Fig. 4.

In Fig. 1 I have shown the pipe $a$ as shrunk over the brass tube $h$, near the end of which is a collar, $i$, that is to run in the journal-box of the wheel or axle, and in Fig. 3 the tubes $a\ b\ c\ d$ are shown shrunk upon the tubes $k$, previously prepared by shrinking on the successive tubes, commencing with the smallest.

The tubes $k$ project beyond the ends of the tubes $a\ b\ c\ d$, and extend within them the required distance to insure the proper and firm holding of the tubes $k$, and bolts or rivets may be introduced crosswise through the axle to connect the parts more firmly to each other. The projecting end $k$ is to form the journal or receive the wheel, as required.

In Fig. 2 I have shown a sleeve, $l$, shrunk upon the end of the axle to form a journal, and this can be removed when worn out.

In cases where pipes cannot be easily obtained of the desired sizes, strips of sheet metal, equal in width to the circumference of the respective pipes, may be used by bending them up into a cylindrical form and placing them one inside or over the other, until the necessary thickness of shaft or axle is attained, and then shrinking around the outer tube rings of iron at suitable distances apart, and rivets may also be introduced crosswise through the axle or shaft. Fig. 4 illustrates this mode of forming the pipe-axle.

The shorter pipes forming the journals at the ends of the axle or shaft may be screwed into the said hollow axle, if desired, and be removable when worn out.

What I claim, and desire to secure by Letters Patent, is—

1. A series of tubes introduced within or over each other to form an axle or shaft, substantially as specified.

2. A separate sleeve, $l$, shrunk upon the axle and forming a journal that can be removed when worn out, as specified.

In witness whereof I have hereunto set my signature this 6th day of August, 1864.

B. J. LA MOTHE.

Witnesses:
 THOS. GEO. HAROLD,
 CHAS. H. SMITH.